United States Patent Office 3,452,858
Patented July 1, 1969

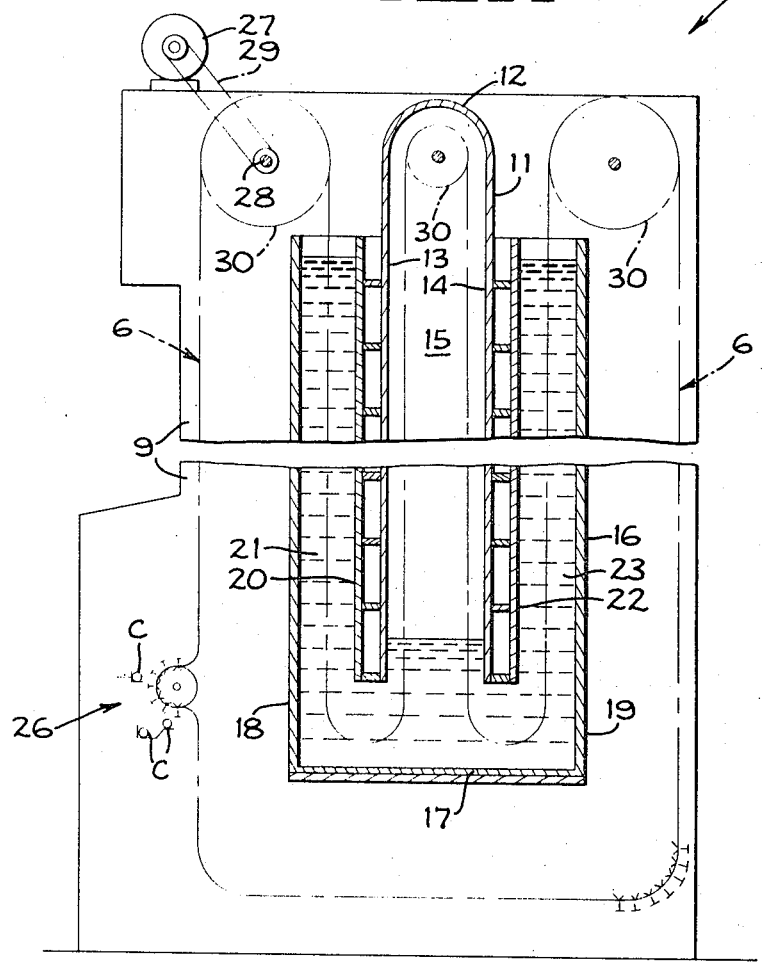

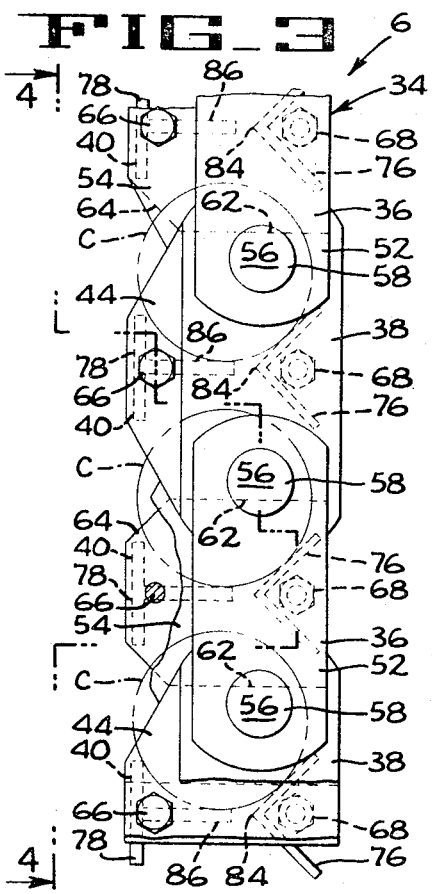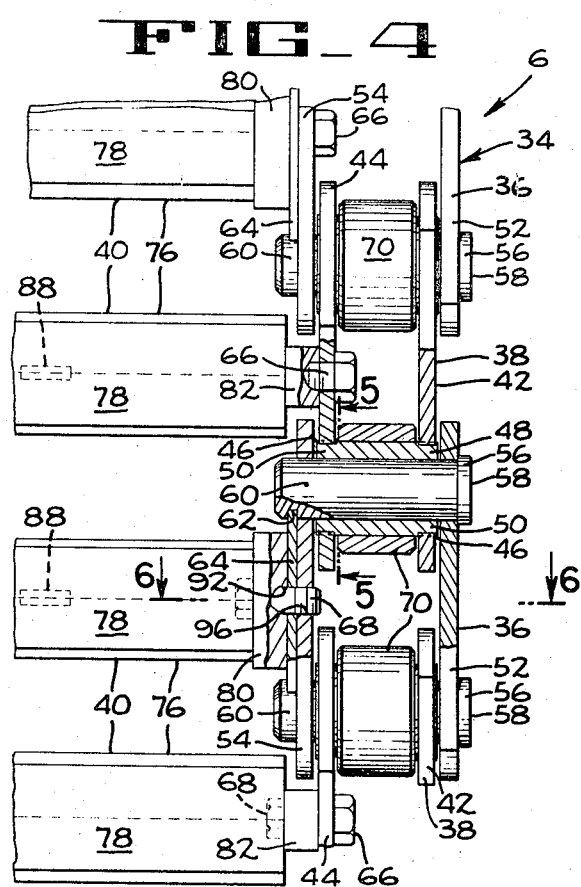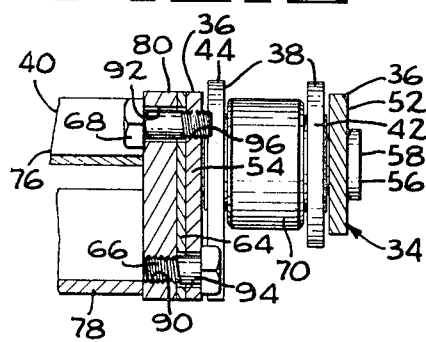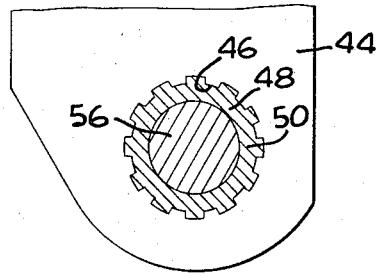
INVENTOR.
JAMES L. REIMERS
BY Francis W. Anderson
ATTORNEY INVENTOR.
JAMES L. REIMERS
BY
Francis W. Anderson
ATTORNEY

3,452,858
HYDROSTATIC COOKER CONVEYOR
James L. Reimers, San Jose, Calif., assignor to FMC Corporation, San Jose, Calif., a corporation of Delaware
Filed June 19, 1967, Ser. No. 647,011
Int. Cl. B65g 17/16
U.S. Cl. 198—151                                    9 Claims

ABSTRACT OF THE DISCLOSURE

A hydrostatic cooker conveyor having chain links provided with bushings splined to associated link arms and being devoid of potential manufacturing produced defects such as cracks and stresses due to welding, upsetting, punching, or press fits. Carrier bars are attached to opposed ones of the links in a manner which reduces weight and stresses on the chains yet retains sufficient beam strength for reliable operation.

BACKGROUND OF THE INVENTION

This invention pertains to improved processing conveyors for a hydrostatic cooker and more particularly relates to improvements in link design, carrier design, and the manner in which the carriers are connected to the links. The subject conveyor is designed for use in the type of cooker disclosed in the United States Letters Patent to Lee 3,286,619 which issued on Nov. 22, 1966.

A problem in the hydrostatic cooker art is to provide a processing conveyor which will have a long life span, for example ten years of normal commercial use of the cooker. In this regard, the processing conveyors of hydrostatic cookers include a plurality of carriers each of which is usually about seven feet long and supports in excess of about sixty pounds of filled containers being processed. The carriers are evenly spaced along the processing conveyor and the processing conveyor has a plurality of vertical runs that are about sixty feet tall. The conveyor is continuously driven along a circuitous path so that each carrier receives a row of containers at substantially atmospheric pressure, advances the carriers and containers downwardly into a preheating housing which gradually heats the containers and the carriers to about 238° F. to 263° F., then advances the carriers and containers upwardly and thereafter downwardly through a steam chamber maintained at about 250° F. to 275° F., then moves the containers and the carriers upwardly through a housing filled with a column of water which gradually cools the containers and carriers to about 210° F., then moves the containers and carriers past cooling sprays of water at about 60° F. before again returning the carriers to a feed and discharge station where the rows of processed containers are discharged and new rows of unprocessed containers are fed into each carrier at which time the above cycle of operation is again repeated.

It has been determined that hydrostatic cooker conveyors are susceptible to failure at welded or highly stressed portions thereof thereby requiring objectionable shutdown of the cooker for repairs. It is believed that this breakage is caused in part by the repeated expansion and contraction of the links and carriers due to the substantial changes of temperature acting thereon during each cycle of operation. This repeated expansion and contraction first tends to open hairline stress cracks at highly stressed areas of the chain links and carrier ends, and thereafter tends to gradually enlarge the cracks causing subsequent breakage.

SUMMARY OF THE INVENTION

The conveyor of the present invention is designed for long life and to overcome the above breakage problem by providing links which are devoid of welds and which include drilled and machined portions but do not include any parts manufactured by upsetting or punching operations which would apply sever stress to the material from which the links are made. The carriers are especially designed for beam strength since they are about seven feet long, and for lightness since the weight of the carriers as well as the weight of the containers must be supported by the chain links.

BRIEF DESCRIPTION OF THE DRAWINGS

FIGURE 1 is a diagrammatic central vertical section illustrating a hydrostatic cooker having the processing conveyor of the present invention trained therethrough.

FIGURE 2 is a perspective of two of the carriers showing the carriers connected to associated links of two parallel spaced endless chains of the conveyor of FIGURE 1, the central portion of the carrier being cut away.

FIGURE 3 is an enlarged elevation showing one end of several adjacent carriers attached to associated ones of the chain links.

FIGURE 4 is a side elevation with certain parts shown in section taken along lines 4—4 of FIGURE 3.

FIGURE 5 is an enlarged section taken along lines 5—5 of FIGURE 4 illustrating a splined bushing connection.

FIGURE 6 is a section taken along lines 6—6 of FIGURE 4.

DESCRIPTION OF THE PREFERRED EMBODIMENT

Figure 7:
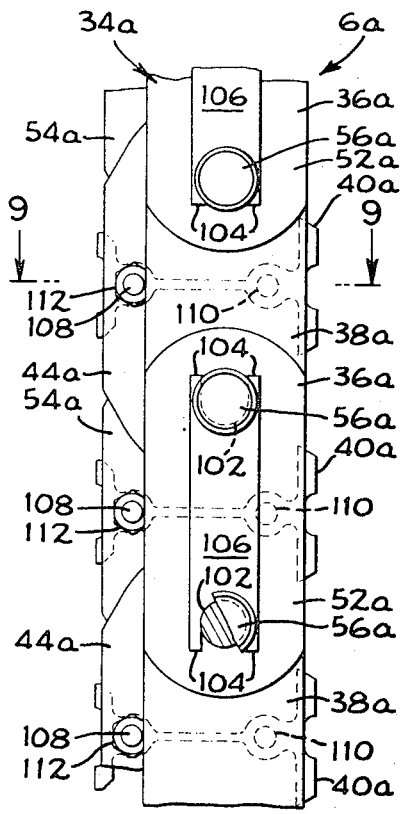
FIGURE 7 is an elevation similar to FIGURE 3 but illustrating a modified chain and the associated ends of several carriers of a different type attached to their associated links.

The improved endless processing conveyor 6 (FIGS. 1 and 2) of the present invention is continuously driven through the processing chambers of a hydrostatic cooker 7. The hydrostatic cooker 7 comprises a pair of spaced vertical support walls 9 (only one wall being shown) that are supported in spaced parallel position. A housing 11 which extends between the two walls 9, has a rounded upper end 12 and two depending walls 13 and 14 which cooperate with the two walls 9 to define a cooking chamber 15 which is filled with steam at a predetermined cooking pressure and temperature, for example, at about 250 to 275° F. and 15 to 20 p.s.i. gauge. The lower end of the housing 11 opens into a water filled trough 16 which is formed by the two walls 9, a transverse horizontal plate 17 and the lower end portions of two transverse vertical walls 18 and 19. The wall 18 cooperates with another transverse wall 20 to define an inlet hydrostatic water leg 21, and the wall 19 cooperates with a transverse vertical wall 22 to provide an outlet hydrostatic leg 23. The hydrostatic legs 21 and 23 cooperate with the trough 16 and are filled with water so as to create sufficient pressure to resist the pressure of steam in the cooking chamber 15. The inlet hydrostatic water leg 21 is thermostatically controlled to provide a gradually increasing water temperature from approximately 210° F.

at its upper end to approximately the sterilizing temperature at its lower end. The outlet water leg 23 is also thermostatically controlled to provide a gradual decrease in water temperature from approximately the sterilizing temperature at its lower end to any suitable temperature below the boiling point of water at atmospheric pressure, depending upon the type of containers being handled, at the upper end thereof. Steam is added to the water in the hydrostatic inlet leg 21 to provide the desired heating temperature therein, and cooled water is directed into the outlet or cooling leg 23 to provide the desired cooling temperature therein. The containers and the processing conveyor 6 may additionally be cooled by spraying cooled water at about 60° F. thereon from nozzles or troughs as the processed containers moved from the upper end of the outlet leg 23 to a feed and discharge station 26.

The processing conveyor 6 is continuously driven by a motor 27 which is connected to a drive shaft 28 by a chain drive 29. As indicated in FIGURE 1, the processing conveyor 6 is trained around pairs of sprockets 30 that are rotatably supported by the vertical walls 9, and is guided along a circuitous path by guide rails (not shown).

The processing conveyor 6 of the present invention comprises a pair of spaced parallel endless chains 32 and 34 (FIG. 2) each defined by a plurality of pivotally interconnected wide links 36 and narrow links 38, measured axially of the link pivot points, to which are mounted a plurality of carriers 40. Each carrier 40 is about seven feet long and is arranged to cooperate with the next adjacent carrier to retain a row of containers C therein as indicated in FIGURE 3.

Since each pair of wide links 36 and narrow links 38 are identical, only one pair of these links will be described in detail.

Each narrow link 38 (FIGS. 2, 3 and 4) comprises a narrow link arm 42 and a wide link and carrier supporting arm 44 each of which includes two large diameter splined openings 46 (FIG. 5) near the ends thereof. A pair of bushings 48, preferably bronze, have both end portions 50 splined and frictionally received within the associated splined openings of the arms 42 and 44 thereby positively locking the bushings 48 from rotation relative to the arms 42 and 44. Each splined end portion of the bushings 48 preferably has at least four teeth, and the radial depth of each tooth is preferably less than the circumferential width of the outer end of each tooth. The splined fit is such that the bushing may be assembled into the splined openings by hand and accordingly, the arms are subjected to no objectionable internal forces such as would occur if the bushings were press fitted into the openings in the arms.

Each wide link 36 includes a narrow link arm 52 and a wide link and carrier supporting arm 54, and each arm has two circular holes near opposite ends thereof. Each wide link is connected to the associated end of the adjacent narrow link by a pivot pin 56 which is manually inserted through the bushing 48 and the associated pin holes in the arms 52 and 54. Each pin 56 has a large diameter head 58 on one end which bears against the arm 52, and a shank 60 which extends through the associated bushing 48 and link arms 52 and 54 and has a locking slot 62 (FIG. 3) formed in the periphery thereof near the other end of the pin. The locking slot has a flat, rotation preventing surface therein. A pin locking plate 64 is slidably received within the locking slots 62 of adjacent pins as indicated in FIGURES 2, 3 and 4 and positively locks the pins from axial movement and also from rotation relative to the wide links 36. Each locking plate 64 is rigidly secured to the associated wide link and carrier supporting arm 54 by oppositely facing cap screws 66 and 68 (FIG. 6). Each link assembly is completed by a roller 70 which is journaled on the associated bushing 48. Lubricating means (not shown) are provided for each pin 56 and directs lubricant between the pin and bushing 48, and also between the bushing and the roller 70.

It will be particularly noted that the splined connection positively locks the bushing to the associated narrow links 38, while the locking plate 64 positively locks the pins to the associated wide links 36 thus assuring that potential wear caused by relative pivotal movement between the wide and narrow links will occur between the wide bearing surfaces of the bushings and pins, and will not occur on the link arms themselves. If a less positively secured bushing is provided, the constant expansion and contraction of the links is apt to cause the bushing to pivot with the pin and relative to the mounting holes of the link arms 42 and 44 thereby causing rapid bushing failure. It should also be noted that such positive locking of the pin to the wide links 36 and bushings to the narrow links 38 is accomplished without press fits which would strain the links and promote premature link breakage.

As indicated in FIGURE 2, the two endless chains 32 and 34 are staggered so that a wide link 36 on one chain will be disposed opposite a narrow link on the other chain thereby permitting all the carriers to be identical in length and shape.

Each carrier 40 comprises a pair of rods in the form of an angle or V-bar 76 and a T-bar 78 which are disposed in parallel spaced relationship to each other. One end of both bars are welded to a wide end plate 80 while the other ends of the bars 76 and 78 are welded to a narrow end plate 82. The apex 84 of the V-bar and the tongue 86 of the T-bar 78 are connected together at even intervals, for example, at about two-foot intervals, by welding tabs 88 (FIG. 4) to both bars thereby providing a relatively light yet sturdy carrier. The end plates 80 and 82 are each provided with one threaded hole 90 and one clearance hole 92 which are aligned with a clearance hole 94 and a threaded hole 96, respectively, in associated ones of the wide link arms 44 and 54. The aforementioned capscrews 66 and 68 are screwed into the threaded holes 90 and 96, respectively, thereby rigidly connecting the end plates to the associated link arms. As indicated in FIG. 4, the wide end plates 80 are bolted to the arms 54 of the wide links 36 and the narrow end plates 82 are bolted to the arms 44 of the narrow links 38 and are disposed between the adjacent wide link arms 54.

In order to widely open the carriers to more effectively feed containers into and discharge containers from the carriers when moving past the feed and discharge station 26, it has been found desirable to offset the carriers relative to the link pitch plane, which plane is a plane that contains all the pivot axes of the supporting links of the carrier. In this regard, the entire V-bar 76 is disposed on one side of the pitch plane with the apex 84 intersecting the plane, while the entire T-bar 78 is disposed outwardly of said plane on the other side thereof. The outer edge of the T-bar 78 extends outwardly from the pitch plane more than twice as far as does the outer extremity of the V-bar 76. The width of the container retaining flange on the T-bar 78 is also somewhat shorter than the space between the free ends of the angle bar with the result that the containers are more easily fed into and discharged from the carriers when moving around a sharp curve at the feed and discharge station 26. However, it is to be understood that the V-bars and T-bars of adjacent carriers cooperate to positively confine the row of containers therein, without the aid of any additional structure such as container guide rails, when the carriers are being moved around larger diameter curves and along linear paths through the remainder of the path of travel of the carriers through the cooker.

The carriers as above described are preferably constructed of steel and have sufficient beam strength and rigidity, due in part to the use of the interconnecting tabs 88, to reliably support the containers without the aid of additional strengthening members.

A second embodiment of the invention as illustrated in FIGURES 7, 8, 9 and 10 features a slightly different conveyor 6a. Since the conveyor 6a is quite similar to the conveyor 6, only the differences will be described in detail and parts of the conveyor 6a which are similar to those of the conveyor 6 will be given the same numeral followed by the letter a.

The wide links 36a and narrow links 38a are identical to the link 36 and 38 except that the pivot pins 56a are slightly longer and have a circular groove 102, rather than an enlarged head, formed near the outer end thereof. Forked ends 104 of a retaining bar 106 are inserted in the grooves 102 of adjacent pins 56a and bears against the link arm 52a and cooperates with the plate 64a to hold the pins from axial movement. Thus, the only machining operations performed on the pins during manufacture are grinding operation and cutting operations which includes turning the groove and cutting the slot, and these operations place no objectionable stresses on the pins which might cause chain failure.

Figure 8:
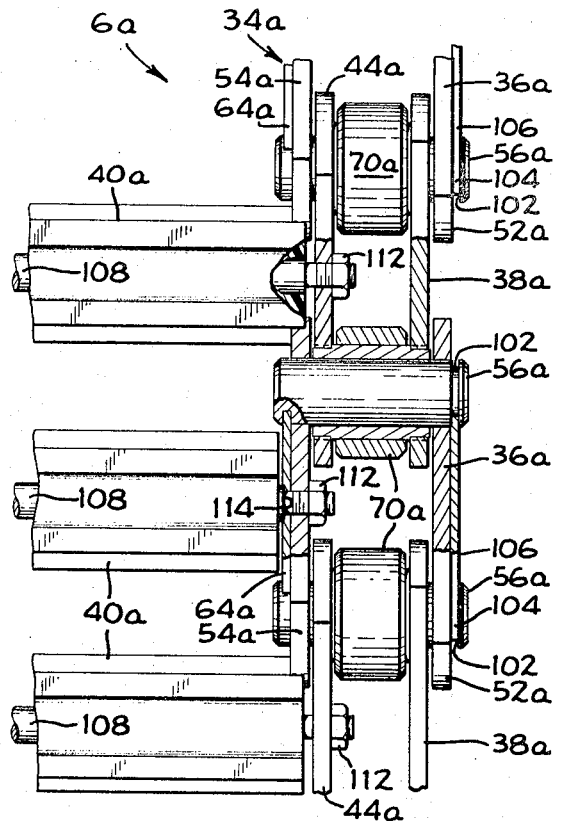
FIGURE 8 is a side elevation with parts in section showing several of the modified carriers of FIGURE 7 connected to one of the chains.
Figure 9:
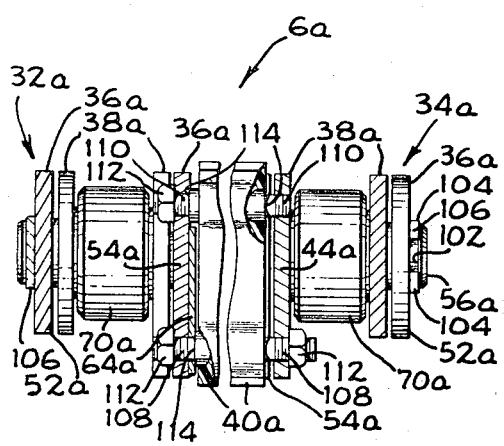
FIGURE 9 is a section taken along lines 9—9 of FIGURE 7 showing a carrier attached to both chains, the central portion of the carrier being cut away.
Figure 10:
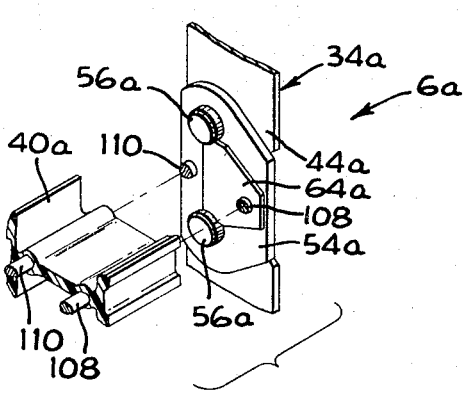
FIGURE 10 is an exploded perspective illustrating a portion of one of the modified carriers and a portion of one of the chains.

As illustrated in FIGURES 7, 8 and 9, the carriers 40a have bodies of generally T-shaped cross section and are connected directly to the associated link arms 44a and 54a of chains 32a and 34a by elongated rods 108 and 110 that extend through openings in the carriers. The rods 108 have nuts 112 threaded on both ends thereof while the rod 110 has a nut on only one end thereof, the other end being slidably received in the associated link arm 44a as illustrated in FIGURE 9. The rods 108 have shoulders 114 formed adjacent their ends which abut the locking plate 64a and rigidly locks the plate 64a against the associated arm 54a of the associated wide link upon tightening of the associated nut 112. The other ends of the rods 108 are slidably received in holes in the arms 44a of the associated narrow link 38a on the other chain. Likewise, each rod 110 has a shoulder 114 on the end adjacent the associated nut 112 thereby locking that end of the rod to link arm 54a. Thus, the carriers and rods 108 and 110 are permitted to expand or contract a small amount due to temperature changes without adversely effecting the loading of the chain links 36a and 38a.

Since the carriers 40a are strengthened and are directly supported by the rods 108 and 110, the carriers may be constructed of a plastic such as PPO which is a polyphenylene oxide plastic material manufactured by Chemical Materials Department of General Electric Company, Pittsfield, Mass. The use of the rods 108 and 110 also makes it possible to use thin walled metal carriers, for example aluminum carriers, which alone could not reliably support the weight of the containers over the seven foot span between chains. Thus, the expense of the carriers, and more importantly the carrier weight which each link 36a and 38a must support, can be considerably reduced by using the above mentioned rods to provide the required beam strength.

It will be apparent from the above description that the improved conveyors of the present invention includes a bushing which is positively locked to a pair of inner link arms by a splined connection, and a pin which is positively locked to the outer link arms by cooperation between a flat faced groove in the pin and a locking plate inserted in the groove against flat face and bolted to one of the outer arms. The conveyor also includes improved carriers which may either be constructed of a pair of spaced parallel rods of different cross section suitably interconnected to provide sufficient beam strength to support a row of containers and connected to the associated links by threaded connectors, or by using plastic or light weight carrier bodies reinforced by parallel rods extending through the carriers and connected to both chains of the conveyor by threaded connectors.

Although the best mode contemplated for carrying out the present invention has been herein shown and described, it will be apparent that modifications and variations may be made without departing from what is regarded to be the subject matter of the invention as set forth in the appended claims.

Having completed a detailed description of the invention so that those skilled in the art could practice the same, I claim:

1. A conveyor for a hydrostatic cooker of the type wherein the conveyor includes a plurality of carriers, two spaced endless chains guided along a circuitous path through the cooker by tracks and cooperating sprockets, each chain being formed by a plurality of narrow and wide links pivotally connected together by pins and bushings, and carrier mountings connecting the carriers to the successive links of said chains; the improvement wherein said bushings and said narrow links are provided with complementary splined surfaces for positively locking said bushings from rotation relative to the associated narrow links, all of said carriers being identical in length with one end of each carrier being bolted directly to a wide link on one chain and the other end of the carrier being bolted to a narrow link of the other chain.

2. A conveyor for a hydrostatic cooker of the type wherein the conveyor includes a plurality of carriers, two spaced endless chains guided along a circuitous path through the cooker by tracks and cooperating sprockets, each chain being formed by a plurality of narrow and wide links pivotally connected together by pins and bushings, and carrier mountings connecting the carriers to successive links of said chains; the improvement wherein said bushings and said narrow links are provided with complementary splined surfaces for positively locking said bushings from rotation relative to the associated narrow links, each link includes two link arms with one of said link arms being wider than the other measured transversely of the link and the ends of each carrier being bolted directly to the associated wide link arms, all of said carriers being identical in length, and one end of a carrier being bolted directly to the wide link arm of a wide link on one chain and the other end of the carrier being bolted to the wide link arm of a narrow link on the other chain.

3. A conveyor according to claim 2 wherein each of said carriers includes a pair of spaced parallel rods, and attachment means for connecting one end of said rods to a link on one of said chains and for connecting the other ends of said rods to a link on the other chain.

4. A conveyor according to claim 3 wherein at least one of said parallel rods are threaded at both ends and wherein said threaded attachment means are nuts screwed on the ends of the rods, said carrier also including an elongated T-shaped body having passages extending longitudinally therethrough for acceptance of said rods, said T-shaped body being of lightweight plastic material.

5. A conveyor according to claim 3 wherein one of said rods is a T-shaped rod and wherein the other rod is a V-shaped rod spaced from said T-shaped rod, and means for attaching the apex of said V-shaped rod to said T-shaped rod at longitudinally spaced intervals.

6. A conveyor according to claim 5 wherein the apex of said V-shaped rod lies on a pitch plane which contains the pivot axes of the supporting links, said V-shaped rod extending to one side of said pitch plane, said entire T-shaped rod being disposed outwardly of the plane on the other sides thereof with its outer extremity extending more than twice as far from said plane as does the outer extremity of said V-shaped rod.

7. A conveyor for a hydrostatic cooker of the type wherein the conveyor includes a plurality of carriers, two spaced endless chains guided along a circuitous path through the cooker by tracks and cooperating sprockets, each chain being formed by a plurality of narrow and wide links pivotally connected together by pins and bushings, and carrier mountings connecting the carriers to successive links of said chains; the improvement wherein said bushings and said narrow links are provided with complementary splined surfaces for positively locking said bushings from rotation relative to the associated narrow links, each of said carriers including a pair of spaced parallel rods, and attachment means for connecting one end of each rod to a link on one of said chains and for connecting the other ends of said rods to a link on the other chain, at least one of said parallel rods being threaded at both ends and wherein said attachment means are nuts threaded on the ends of the rods, said carrier also including an elongated T-shaped body having passages extending longitudinally therethrough for acceptance of said rods.

8. A conveyor according to claim 7 wherein said T-shaped body is of lightweight plastic material.

9. A conveyor for a hydrostatic cooker of the type wherein the conveyor includes a plurality of carriers, two spaced endless chains guided along a circuitous path through the cooker by tracks and cooperating sprockets, each chain being formed by a plurality of narrow and wide links pivotally connected together by pins and bushings, and carrier mountings connecting the carriers to successive links of said chains; the improvement wherein said bushings and said narrow links are provided with complementary splined surfaces for positively locking said bushings from rotation relative to the associated narrow links, each of said carriers including a pair of spaced parallel rods, and attachment means for connecting one end of each rod to a link on one of said chains and for connecting the other ends of said rods to a link on the other chain, one of said rods being a T-shaped rod and the other rod being a V-shaped rod spaced from said T-shaped rod.

References Cited

UNITED STATES PATENTS

| | | | |
|---|---|---|---|
| 951,555 | 3/1910 | Belcher | 74—251 |
| 3,182,786 | 5/1965 | Reimers | 198—131 |
| 3,211,275 | 10/1965 | Van der Winden | 198—131 |
| 3,315,787 | 4/1967 | Van der Winden | 198—131 |

FOREIGN PATENTS 999,900　10/1951　France.

EDWARD A. SROKA, *Primary Examiner.*

U.S. Cl. X.R.

198—152